(12) United States Patent
Shimane et al.

(10) Patent No.: US 8,284,508 B2
(45) Date of Patent: Oct. 9, 2012

(54) IMAGING LENS WITH A LENS POSITION ADJUSTING MECHANISM

(75) Inventors: Atsushi Shimane, Saitama (JP); Katsuhiko Nishikawa, Saitama (JP)

(73) Assignee: Tamron Co., Ltd., Saitama (JP)

( * ) Notice: Subject to any disclaimer, the term of this patent is extended or adjusted under 35 U.S.C. 154(b) by 106 days.

(21) Appl. No.: 12/975,882

(22) Filed: Dec. 22, 2010

(65) Prior Publication Data

US 2011/0090579 A1  Apr. 21, 2011

Related U.S. Application Data

(63) Continuation of application No. 11/641,060, filed on Dec. 19, 2006, now abandoned.

(30) Foreign Application Priority Data

Mar. 7, 2006 (JP) ................................. 2006-061120

(51) Int. Cl.
G02B 7/02 (2006.01)
(52) U.S. Cl. ....................................... 359/824; 359/829
(58) Field of Classification Search .................. 359/811, 359/813, 815, 819, 822–824, 827, 829; 396/329, 396/530; 353/100, 101
See application file for complete search history.

(56) References Cited

U.S. PATENT DOCUMENTS

| | | | |
|---|---|---|---|
| 4,309,076 A | 1/1982 | Ito | |
| 4,380,378 A * | 4/1983 | Tamura | 359/699 |
| 4,515,438 A | 5/1985 | Ohnuki | |
| 4,740,065 A | 4/1988 | Aoyagi | |
| 5,699,200 A | 12/1997 | Uno et al. | |
| 7,061,699 B2 | 6/2006 | Watanabe et al. | |
| 7,187,508 B2 * | 3/2007 | Chiang | 359/822 |
| 7,221,524 B2 * | 5/2007 | Ye et al. | 359/819 |

FOREIGN PATENT DOCUMENTS

| | | |
|---|---|---|
| JP | 2003-202479 A | 7/2003 |
| WO | 92/20001 A1 | 11/1992 |

OTHER PUBLICATIONS

Patent Abstracts of Japan 2003-202479, Jul. 18, 2003.
Patent Abstracts of Japan 2002-122769, Apr. 26, 2002.
Patent Abstracts of Japan 2000-075183, Mar. 14, 2000.
Patent Abstracts of Japan 01-173007, Jul. 7, 1989.

* cited by examiner

*Primary Examiner* — Thomas K Pham
*Assistant Examiner* — Brandi Thomas
(74) *Attorney, Agent, or Firm* — Jacobson Holman PLLC

(57) ABSTRACT

An imaging lens for adjusting a position of an adjusting lens to be carried out easily and which has an improved impact resistance. The imaging lens includes a lens frame for supporting a lens serving as an adjusting lens and a support frame for supporting the lens frame. A contact section for support frame adjustment operable to come into contact with the lens frame is arranged in the support frame. A contact section for lens frame adjustment operable to come into contact with the support frame is arranged in the lens frame. The lens frame is configured such that the fastening force generated between the lens frame and the support frame can be applied vertical with respect to the contact section for support frame adjustment in a state of the contact section for lens frame adjustment held in contact with the contact section for support frame adjustment.

10 Claims, 5 Drawing Sheets

IMAGING LENS WITH A LENS POSITION ADJUSTING MECHANISM

CROSS-REFERENCE TO RELATED APPLICATIONS

The present patent application is a continuation of application Ser. No. 11/641,060, filed Dec. 19, 2006, now abandoned which claims priority from Japanese Application No. 2006-061120, filed Mar. 7, 2006, which are incorporated herein by reference in their entireties.

FIELD OF THE INVENTION

The present invention relates to an imaging lens comprising a lens position adjusting mechanism. Specifically, the present invention relates to an imaging lens comprising a mechanism enabling a fine adjustment of a lens position along a direction of optical axis, in an interchangeable lens for a single-lens reflex camera allowing for its lens to be interchanged with another, for example.

DESCRIPTION OF THE PRIOR ART

It is required in a process for assembling a plurality of lenses into a lens barrel that resultant pitches between adjacent lenses are in conformity with design values. However, there is a need arisen in an actual assembling process to correct any error in the direction of optical axis, which could emerge between the actual lens spacing and the design values. In one known method among others in the prior art that have been commonly practiced for correcting the error, a washer is incorporated between a lens frame and a stationary member so as to adjust the position and thereby to correct the error thereof in the direction of optical axis.

To address these problems, one lens barrel structure according to the prior art includes a rotary member having a cam groove, which is disposed on an outer periphery of a stationary member (see, for example, Japanese Patent Application Laid-open No. JP-A-2003-202479). In another lens barrel of optical device according to the prior art, a first retaining member and a second retaining member are adapted to come into an engagement via a cam, in which rotation of the first retaining member around an optical axis causes the second retaining member to move along the direction of optical axis with respect to the first retaining member (see, for example, Japanese Patent Application Laid-open No. JP-A-2002-122769). In still another adjusting mechanism for an imaging lens in the prior art has employed an eccentric pin and leading groove so as to adjust a position of a lens (see, for example, Japanese Patent Application Laid-open No. JP-A-2000-75183). In still another example of mechanism for a minute distance adjustment in the prior art, either one of a fixed member and a movable member has a cam unit enabling a movement of the member along the direction of optical axis so as to accomplish the adjustment of its position in the direction of optical axis (see, for example, Japanese Patent Application Laid-open No. JP-A-Heisei-1-173007). Further, in one retaining mechanism of a plastic lens according to the prior art, a pin is securely attached to either one of a stationary section in a mirror frame and a plastic lens and the elongated slot is formed in the other of them, and further an inclined guide surface is defined in either one of the stationary section in the mirror frame and the plastic lens, so as to accomplish the adjustment of the position in the direction of optical axis of the plastic lens (see, for example, Japanese Utility Model Application Laid-open No. JP-U-A-Showa-62-91615).

The adjusting method using the washer according to the prior art as described above has a problem that the adjusting operation is cumbersome since it requires the washer to be removed each time when the lens position is to be adjusted. In addition, the mechanism allowing for a minute distance adjustment by using a cam in the prior art also has a problem that if the image-taking lens used is once subject to some impact and the impact causes a displacement in a contact surface of the cam, a gap could be created between the lens frame and the stationary member along the direction of optical axis, leading to the deterioration in an optical performance of the image-taking lens. Besides, the retaining mechanism of the plastic lens that has employed the inclined guide surface in the prior art has also a problem of unsatisfied capability for retaining the lens.

Referring to FIG. 7, when an image-taking lens is assembled, a first unit of lens system (not shown) is fixedly secured to a first unit of lens frame 421. The first unit of lens frame 421 is fixedly secured to a first unit of support frame 431. A contact section for support frame adjustment 434 is defined in the first unit of support frame 431 so as to thrill a cam surface. The contact section for support frame adjustment 434 is formed to make an angle with respect to the direction of optical axis 108. A contact section for lens frame adjustment 424 is defined in the first unit of lens frame 421 so as to form a support frame mounting surface. The contact section for lens frame adjustment 424 is formed to make an angle with respect to a plane perpendicular to the direction of optical axis 108. A fixing screw 440 securely couples the first unit of lens frame 421 to the first unit of support frame 431 in a state of the contact section for lens frame adjustment 424 in contact with the contact section for support frame adjustment 434. The fixing screw 440 is fixed (by self-tapping) in the first unit of support frame 431 through an elongated arcuate slot formed in the first unit of lens frame 421. In this condition, a lower surface of a head portion 442 of the fixing screw 440 is in contact with a screw head receiving surface 428 extending perpendicularly with respect to the direction of optical axis 108 of the first unit of lens frame 421.

Turning now to FIG. 8, when the image-taking lens is subject to some impact, the first unit of lens frame 421 could occasionally move in a direction perpendicular to the optical axis 108. If there occurs any displacement of the first unit of lens frame 421, the lower surface of the head portion 442 of the fixing screw 440 is no more in contact with the screw head receiving surface 428 of the first unit of lens frame 421, resulting in a gap (so called "looseness") "GP" created between the lower surface of the head portion 442 of the fixing screw 440 and the screw head receiving surface 428. Such a gap, GP, created by the impact could lead to the deteriorated optical performance of the image-taking lens.

Turning now to FIG. 9, a fastening force "FC" of the fixing screw 440 applied to the first unit of lens frame 421 can be decomposed into a normal force "FN" acting in a perpendicular direction with respect to the contact section for support frame adjustment 434 and a tangential force "FT" acting in a direction along a surface of the contact section for support frame adjustment 434. Accordingly, the emergence of the tangential force, FT, can reduce the normal force, FN, for fixing the fixing screw 440 to be smaller than the fastening force, FC. Consequently, if the imaging lens is subject to the impact, the first unit of lens frame 421 could be under the threat of being forced to move in the direction normal to the direction of optical axis 108. To prevent such a disadvantage resultant from the development of the gap, GP, as mentioned above, the method practiced conventionally has employed an adhesive to be applied between the lower surface of the head 442 and the screw head receiving surface 428.

An object of the present invention is to provide an imaging lens allowing for an adjustment of a lens position to be accomplished easily. Another object of the present invention is to provide an imaging lens having an improved impact resistance. Yet another object of the present invention is to provide an imaging lens comprising a lens position adjusting mechanism which has a simplified structure and thus allows constituent parts thereof to be manufactured and assembled in an easier manner.

SUMMARY OF THE INVENTION

The present invention provides an imaging lens comprising a plurality of lenses, which is equipped with an adjusting mechanism for moving a lens, among the plurality of lenses, specifically serving for position adjustment in the direction of an optical axis, said imaging lens further comprising a lens frame for supporting the adjusting lens serving for the position adjustment and a support frame for supporting the lens frame. In the imaging lens of the present invention, a contact section for support frame adjustment operable to come into contact with the lens frame is disposed in the support frame, and a contact section for lens frame adjustment operable to come into contact with the support frame is disposed in the lens frame. The lens frame is characterized in such a configuration that a fastening force effective between the lens frame and the support frame can be applied perpendicularly with respect to the contact section for support frame adjustment in a state of the contact section for lens frame adjustment held in contact with the contact section for support frame adjustment. This configuration can facilitate the easier adjustment of the lens position.

In the imaging lens of the present invention, the contact section for support frame adjustment is formed as a "helical surface" and the contact section for lens frame adjustment is formed as a "helical surface" operable to come into contact with the contact section for support frame adjustment, wherein the configuration allows the fastening force to be applied such that the lens frame can be fixed to the support frame via a fixing member in a state of the "helical surface" of the contact section for lens frame adjustment held in contact with the "helical surface" of the contact section for support frame adjustment. Preferably, the fixing member may comprise a fixing screw disposed within the contact section for support frame adjustment. Preferably, the fixing screw may be positioned through an elongated arcuate slot in the lens frame. In the configuration of the present invention, the fastening force effective between the lens frame and the support frame can be applied at right angles to the contact section for support frame adjustment in a state of the fixing screw having been fastened. Therefore, there is no more such component of the fastening force provided by the fixing screw that acts in the tangential direction along a surface of the contact sections, thus ensuring the sufficiently great fastening force generated by the fixing screw. Consequently, this can mitigate a worry that the lens frame could be displaced with respect to the support frame, when the image-taking lens is subject to the impact.

In the imaging lens of the present invention, the lens frame comprises a support frame mounting section for fixedly securing the lens frame to the support frame, in which preferably the support frame mounting section extends along a circumferential direction and has a flange-like configuration defining a part of a ring in a plane view, the support frame mounting section further includes a screw receiving surface arranged for receiving a lower surface of a head portion of the fixing screw, and the screw receiving, surface is individually arranged in parallel with the contact section for lens frame adjustment. This configuration can facilitate the production of an imaging lens comprising a lens position adjusting mechanism which has a simplified structure and thus allows for an easier manufacturing and assembling of constituent parts thereof.

In the imaging lens of the present invention, it is preferred that the support frame mounting section for fixedly securing the lens frame to the support frame is arranged along a circumferential direction, wherein the fixing screw is screwed in the support frame in a state of a threaded portion of the fixing screw held as passing through the elongated arcuate slot. This configuration can facilitate the production of an imaging lens comprising a lens position adjusting mechanism which has a simplified structure and thus allows for an easier manufacturing and assembling of constituent parts thereof.

Since the imaging lens of the present invention has employed the configuration as specified above, the lens position can be adjusted in a simple operation. Owing to the configuration of the present invention, in which a central axis line of the fixing screw serving to securely fasten the first unit of lens frame extends to be perpendicular with respect to the contact section for support frame adjustment, a fear of the gap that could otherwise develop between the lower surface of the head portion of the fixing screw and the screw head receiving surface can be eliminated. Therefore, any ineffective component of the fastening force otherwise generated by the fixing screw can be also eliminated, thus ensuring the sufficiently great fastening force to be applied. Further, since in the imaging lens of the present invention, even if there occurs any displacement of the first unit of lens frame resultant from the impact on the imaging lens, the first unit of lens frame can be held in the location as it is, therefore any additional adverse effect on the optical performance can be reduced. This implies that the present invention can achieve an imaging lens having an improved impact resistance. In addition, the present invention can accomplish an imaging lens comprising a lens position adjusting mechanism which has a simplified structure and thus allows for the easier manufacturing and assembling of constituent parts thereof.

DESCRIPTION OF THE PREFERRED EMBODIMENTS

Figure 1:
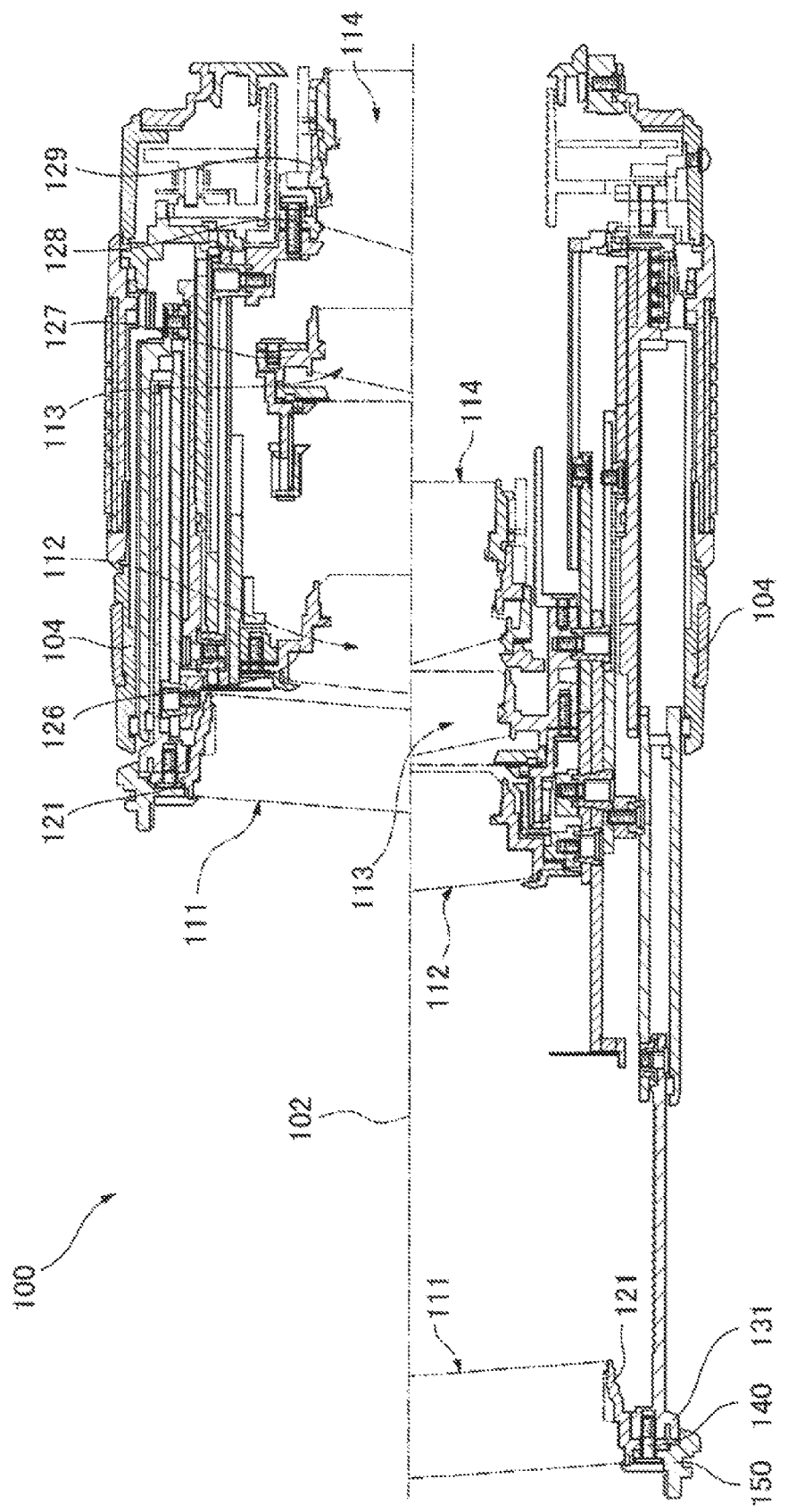
FIG. 1 is a longitudinal sectional view showing a structure of an imaging lens in an embodiment of the present invention.

Preferred embodiments of the present invention will now be described with reference to the attached drawings. Referring first to FIG. 1, an imaging lens 100 configured as a quadruple zooming lens has a lens system, an optical axis 102 of the imaging lens 100 and a lens barrel 104. In FIG. 1, a sectional view present above the optical axis 102 illustrates a state of the imaging lens 100 when its focal distance is set in a short-focus side, while the other sectional view present below the optical axis 102 illustrates a state of the imaging lens 100 when its focal distance is set in a long-focus side. The present invention is applicable not only to the zooming lens but also to a single-focus lens. The imaging lens 100 comprises a first unit of lens system 111, a second unit of lens system 112, a third unit of lens system 113, and a fourth unit of lens system. The first unit of lens system 111 forms a front unit of lens system. The fourth unit of lens system 114 forms a rear unit of lens system. Each of the lens systems includes one or more pieces of lenses.

The first unit of lens system 111 is fixedly secured to a first unit of lens frame 121. The second unit of lens system 12 is fixedly secured to a second unit of lens frame 126. The third unit of lens system 113 is fixedly secured to a third unit of lens frame 127. The fourth unit of lens system 114 is fixedly secured to a rear unit of first lens frame 128 and a rear unit of second lens frame 129. The first unit of lens system 121 is fixedly secured to the first unit of support frame 131. The first unit of lens frame 121, the second unit of lens frame 126, the third unit of lens frame 127, the rear unit of first lens frame 128 and the rear unit of second lens frame 129 may be disposed with respect to the lens barrel 104 so as to be movable in a direction along the optical axis 102. The first unit of support frame 131 may be formed as a sliding frame that is movable in the direction along the optical axis 102. Alternatively, the first unit of support frame 131 may be formed as a stationary frame that is not allowed to move in the direction along the optical axis 102. A threaded frame for a filter is securely disposed in front of the first unit of lens frame 121.

Each of the lens frames is made of flexible and hard-to-break resilient material and has a ring-like configuration. For example, the lens frame may be made of engineering plastic, such as polycarbonate (PC-G30%). The first unit of lens frame 121 is included in a lens position adjusting mechanism and forms an adjusting lens frame operable to adjust the position of the lens in the direction along the optical axis 102. Although in the illustrated embodiment, the first unit of lens frame 121 forms the adjusting lens frame, any of the other units of lens frame may also form the adjusting lens frame. Although in the illustrated embodiment, the first unit of lens system 111 forms an adjusting lens, one or more pieces of lenses included in the first unit of lens system 111 or other units of lens system may also form the adjusting lens.

Figure 2:
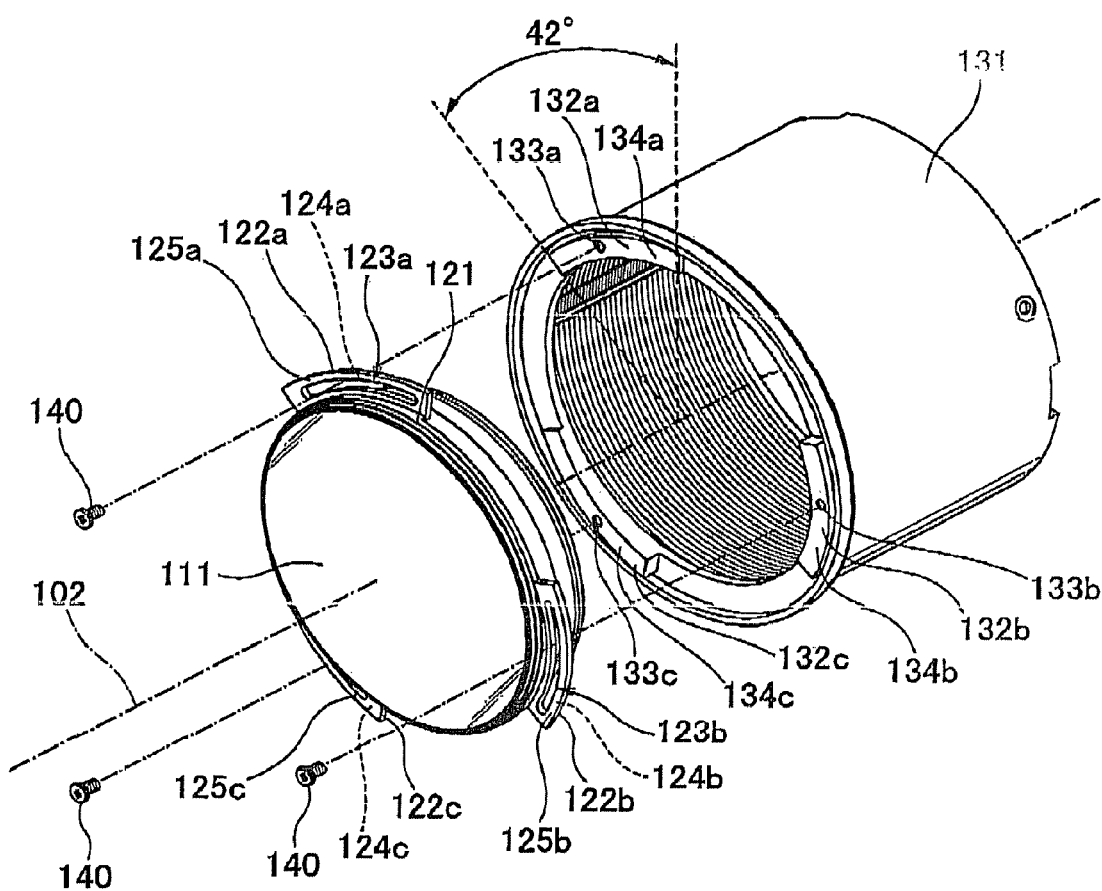
FIG. 2 is an exploded perspective view showing a first unit of lens frame and a first unit of support frame in the embodiment of the present invention.
Figure 3:
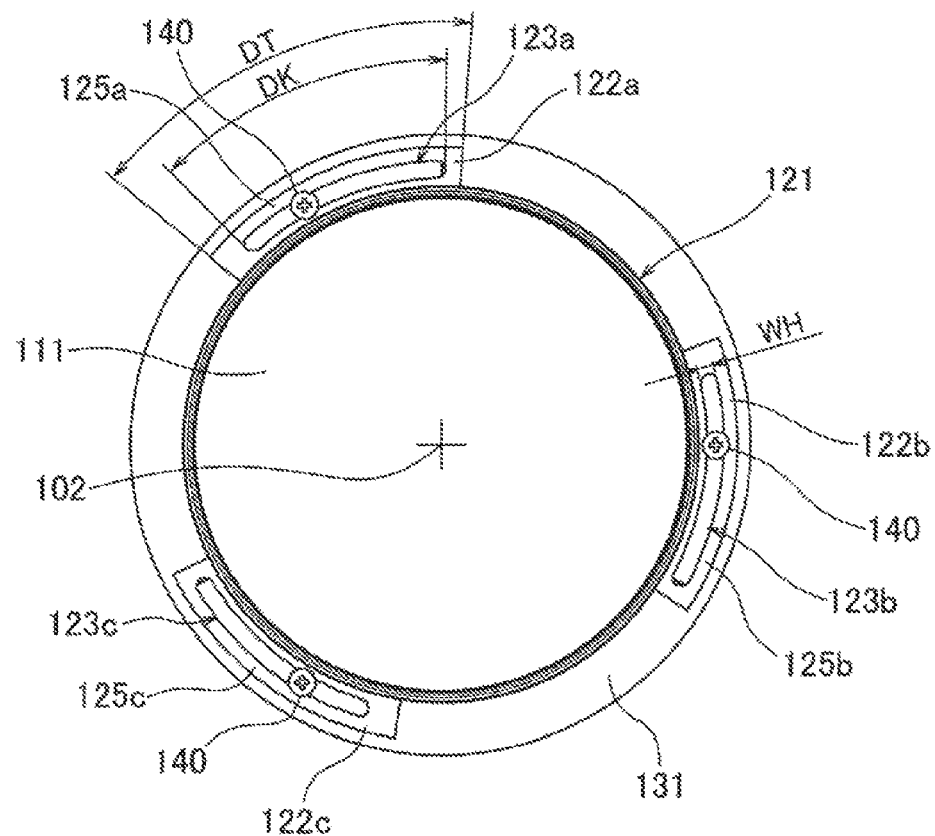
FIG. 3 is a front view showing the first unit of lens frame and the first unit of support frame in the embodiment of the present invention.
Figure 4:
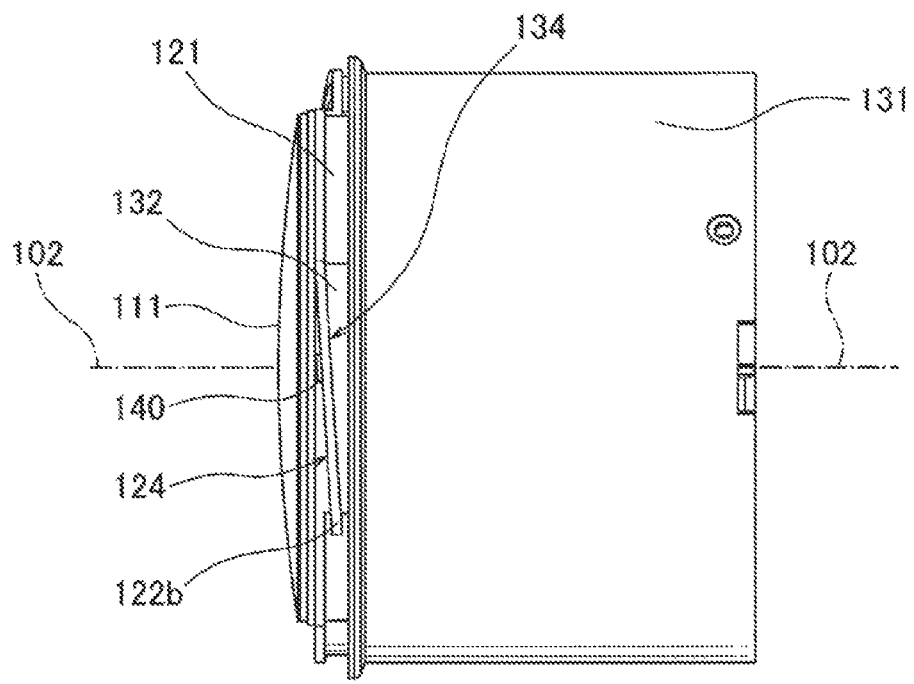
FIG. 4 is a side elevational view showing the first unit of lens frame and the first unit of support frame in the embodiment of the present invention.

Turning now to FIGS. 2 to 4, the first unit of lens system 111 is fixedly secured to an inner circumferential port on of the first unit of lens frame 121. A plurality of support frame mounting sections 122 are arranged in the first unit of lens frame 121 around the optical axis 102 along a circumferential direction. Each of the support frame mounting sections 122 may be formed in a flange-like configuration defining a part of a ring in plan view. The support frame mounting sections 122 may consist of three support frame mounting sections 122a-122c, for example. Those three support frame mounting sections 122a-122c may be configured so that a central angle "DT" subtended by each of the mounting sections is in a range of 30 degrees to 90 degrees around the optical axis 102. Preferably, the support frame mounting sections 122a-122c may be equally spaced from one another by an angular pitch in the circumferential direction around the optical axis 102. Although in the illustrated embodiment, three support frame mounting sections are provided, two or four or more of the support frame mounting sections may be provided. Preferably, three or four support frame mounting sections may be provided. A single fixing screw 140 may be provided for each one of the support frame mounting sections.

A contact section for lens frame adjustment 124, which forms a first cam surface as well as a support frame mounting surface, is arranged in each of the support frame mounting sections 122a-122c along the circumferential direction. Preferably, the contact section for lens frame adjustment 124 may be formed in an outer peripheral portion of the first unit of lens frame 121 to define a "helical surface". The contact section for lens frame adjustment 124 may consist of three elements of contact section for lens frame adjustment 124a-124c, which like the support frame mounting sections 122a-122c, may be equally spaced from one another by an angular pitch in the circumferential direction around the optical axis 102.

An elongated arcuate slot 123 through which a threaded portion of the fixing screw is inserted is arranged in each of the support frame mounting sections 122a-122c around the optical axis 102 along the circumferential direction. The elongated arcuate slots 123 may consist of, for example, three elements of elongated arcuate slot 123a-123e. Preferably, the elongated arcuate slots 123a-123c may be spaced apart around the optical axis 102 with each subtending a central angle "DK" in a range of 25 degrees to 85 degrees. Preferably, the central angle, DK, subtended by each of the elongated arcuate slots 123a-123c may be sized to be smaller than the central angle, DT, subtended by each of the support frame mounting sections 122a-122c by 5 degrees to 15 degrees. A width "WH" of each of the elongated arcuate slots 123a-123c is sized to be greater than a diameter of the threaded portion of the fixing screw 140.

A screw receiving surface 125 for receiving a lower surface of a head portion of the fixing screw 140 is disposed in each of the support frame mounting sections 122a-122c in a side opposite to another side in contact with the first unit of support frame 131. The screw receiving surfaces 125 may consist of, for example, three elements of screw receiving surface 125a-125c. Each of the screw receiving surfaces 125a-125c may be arranged so as to be equally distant away from each of the contact section for lens frame adjustments 124a-124c. This implies that preferably each of the support frame mounting sections 122a-122c may be formed as a plate-like flange having a helical surface with a uniform thickness.

The fixing screw 140 is provided for the purpose of securely fastening the first unit of lens frame 121 to the first unit of support frame 131. The fixing screw 140 may be made of metal, such as carbon steel for cold forging. The elongated arcuate slots 123a-123c are formed in the support frame mounting sections 122a-122c, respectively, around the optical axis 102 along the circumferential direction, through which the threaded portions of the fixing screws 140 are inserted to securely fasten the first unit of lens frame 121 to the first unit of support frame 131. The diameter of the treaded portion of the fixing screw 140 may be determined to be smaller than the width of the elongated arcuate slot 123. A diameter of the head of the threaded portion of the fixing screw 140 may be determined to be greater than the width of the elongated arcuate slot 123.

A lens frame mounting section 132 comprising a plurality of elements is arranged in the first unit of support frame 131 along the circumferential direction. The lens frame mounting section 132 may consist of, for example, three elements of lens frame mounting section 132a-132c. The locations where the lens frame mounting sections 132a-132c are to be disposed are determined so as to correspond to the locations where the support frame mounting sections 122a-122c are to be disposed, respectively. Therefore, preferably, the number of the lens frame mounting sections 132a-132c is equal to the number of the support frame mounting sections 122a-122c. Preferably, the central angle subtended by each of the lens frame mounting sections 132a-132c is equal to the central angle subtended by each of the support frame mounting sections 122a-122c.

A contact section for support frame adjustment 134, which forms a second cam surface to be brought into contact with the above-described first cam surface as well as lens frame mounting surface, is arranged in each of the lens frame mounting sections 132a-132c around the optical axis 102 along the circumferential direction. The contact section for support frame adjustment 134 is formed to define a "helical surface" operable to come into contact with the helical surface of the contact section for lens frame adjustment 124. The contact section for support frame adjustments 134 may consist of, for example, three elements of contact section for support frame adjustment 134a-134c, which like the three elements of contact section for lens frame adjustment 124a-124c, may be equally spaced from one another by an angular pitch in the circumferential direction around the optical axis 102. The angle of inclination of each of the contact sections for support frame adjustment 134a-134c is formed the same as the angle of inclination of each of the contact sections for lens frame adjustment 124a-124c. An untapped hole 133 for the fixing screw 140 is provided in each of the lens frame mounting sections 132a-132c. The untapped holes 133 may consist of, for example, three elements of untapped hole 133a-133c. As for the reference location where the untapped hole 133 is to be formed, for example, the untapped hole may be arranged at a location 0.5 mm backward from the end surface portion at a most front location in the contact section for support frame adjustment 134 in the direction along the optical axis 102.

Figure 5:
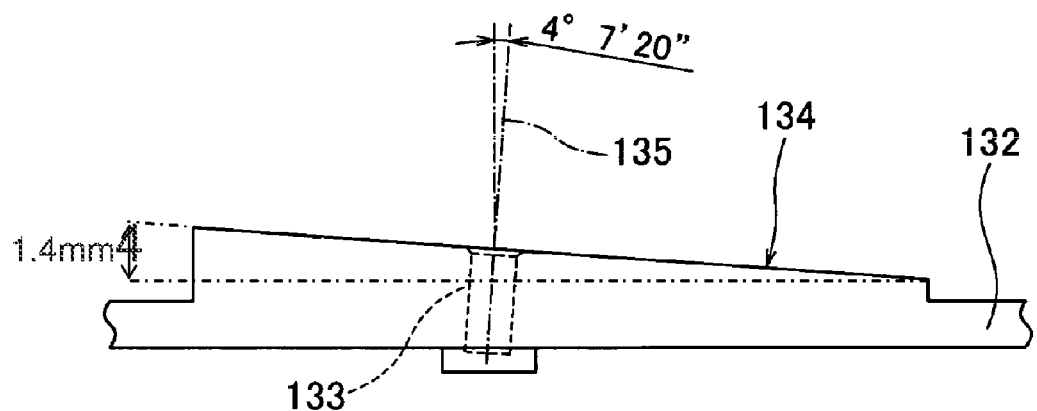
FIG. 5 is a schematic partial sectional view showing a shape of a cam surface of the first unit of support frame in the embodiment of the present invention.

Turning now to FIG. 2, the central angle subtended by the contact section for support frame adjustment 134 may be, for example, 42 degrees around the optical axis 102. Preferably, the angle of inclination of the contact section for support frame adjustment 134, which subtends an angle of 42 degrees, may be defined by a height difference of 1.4 mm measured in the direction parallel to the optical axis 102. Preferably, a relative error in the angle of inclination of the contact section for support frame adjustment 134 may be a height difference of 0.02 or smaller. Preferably, the central axis line 135 of the untapped hole 133 may be defined to make an angle of 4-degree 7-minute 20-second with respect to the plane normal to the optical axis 102, as shown in FIG. 5. In other words, the central axis line of the threaded portion of each of the fixing screws 140 forms an angle of 4-degrees 7-minutes 20-seconds with respect to a plane normal to the optical axis 102 when the fixing screws 140 are fixedly secured into the support frame 131.

Figure 6:
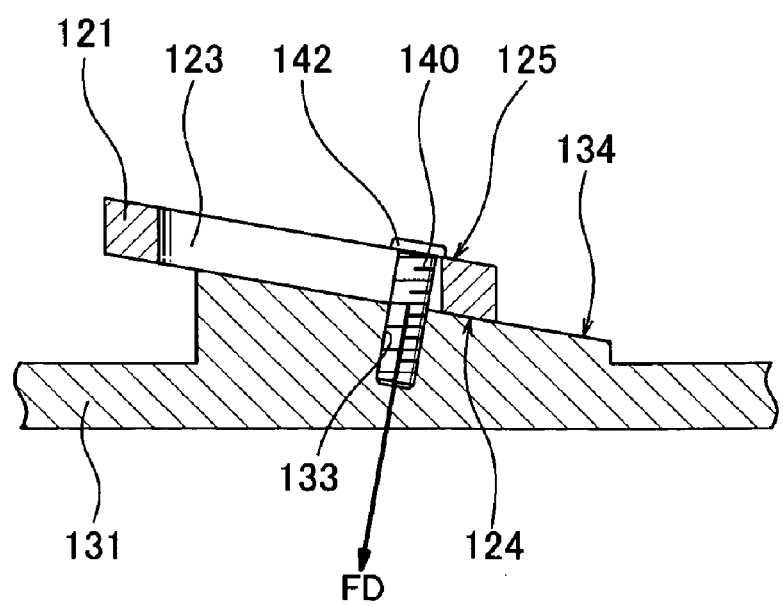
FIG. 6 is a schematic partial sectional view showing a configuration of respective components involved in an adjusting mechanism as assembled in the embodiment of the present invention.
Figure 7:
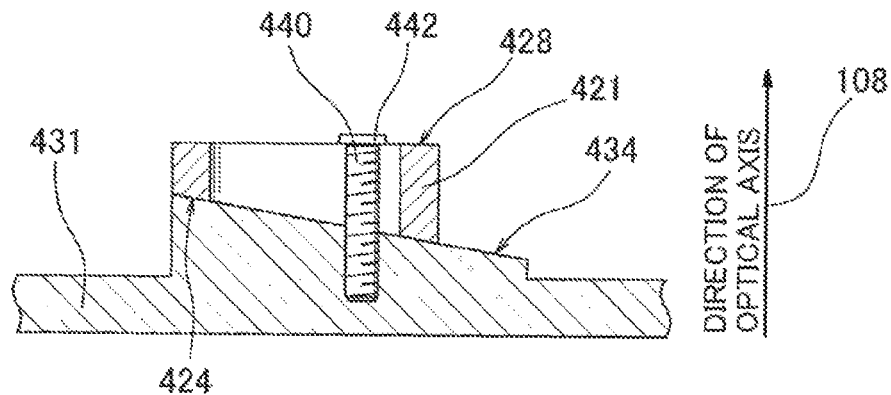
FIG. 7 is a schematic partial sectional view showing a configuration of respective components involved in the adjusting mechanism as assembled in an exemplary adjusting mechanism using a cam in a prior art.
Figure 8:
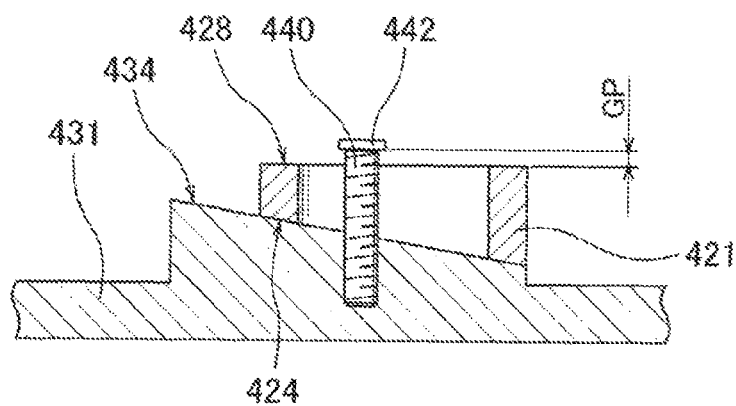
FIG. 8 is a partial sectional view showing a state of respective components involved in the adjusting mechanism as after having been subject to some impact in the exemplary adjusting mechanism using the cam in the prior art.
Figure 9:
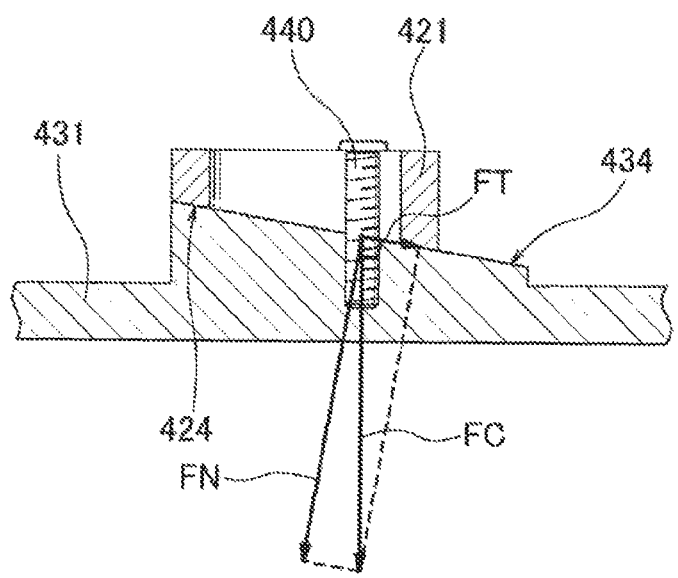
FIG. 9 is a schematic partial sectional view showing a decomposition of a force applied onto a cam in the adjusting mechanism using the cam in the prior art.

Turning now to FIGS. 3 and 4 and FIG. 6, the contact section for lens frame adjustment 124 is brought into contact with the contact section for support frame adjustment 134, the first unit of lens frame 121 is rotated around the optical axis 102 so as to adjust the first unit of lens system 111 and thereby to determine the position of the first unit of lens frame 121, and then the fixing screw 140 is fixedly secured into the untapped hole 133 of the first unit of support frame 131. The fixing screw 140 is inserted through the elongated arcuate slot 123 of the first unit of lens frame 121 and fixedly secured (by self-tapping) into the untapped hole 133 of the first unit of support frame 131. In the present invention, the fastening force generated between the lens frame 121 and the support frame 131 is designed such that the force can be applied perpendicular to the contact section for support frame adjustment 134 in the state of the fixing screw 140 having been fastened, as shown in FIG. 6.

In the state of the fixing screw 140 having been fastened securely, the lower surface of the head portion 142 of the fixing screw 140 is in contact with the screw head receiving surface 125 of the first unit of lens frame 121. When the first unit of lens frame 121 is fixedly secured to the first unit of support frame 131, the central axis line of the fixing screw 140 extends in a perpendicular direction to the contact section for support frame adjustment 134. The fastening force "FD" applied to the first unit of lens frame 121 by the fixing screw 140 acts perpendicular to the contact section for support frame adjustment 134. Accordingly, there would be no more force component generated in the tangential direction with respect to the fastening force FD, thus ensuring a sufficiently great fastening force brought by the fixing screw 140 to be available. Consequently, there is little possibility that the first unit of lens frame 121 could be displaced upon impact on the imaging lens. This means that if the configuration according to the present invention is employed, the fastening three, from the fixing screw 140 can be fully available and thus the imaging lens having the improved impact resistance can be realized.

According to the present invention, it becomes possible to manufacture an imaging lens allowing for an operation of adjusting a lens position to be carried out easily. Since the imaging lens of the present invention can reduce an adverse effect to be given to the optical performance even at the impact on the imaging lens, advantageously the production of the imaging lens having improved impact resistance is made feasible by the present invention. According to the present invention, it becomes possible to manufacture the imaging lens comprising a lens position adjusting mechanism which has a simplified structure and allows its constituent parts to be manufactured and assembled in an easier manner.

We claim:
1. An imaging lens having an optical axis and comprising:
a plurality of lenses, one of the lenses being an adjusting lens,
an adjusting mechanism for adjusting the position of the adjusting lens in the direction of the optical axis,
a lens frame for supporting the adjusting lens,
a support frame for supporting said lens frame,
a plurality of support frame mounting sections arranged in the lens frame around the optical axis along a circumferential direction, each of the support frame mounting sections being formed in a flange-like configuration defining a part of a ring in plan view,
the support frame mounting sections each having arranged therein an elongated arcuate slot and a screw receiving surface around the arcuate slot, the arcuate slots being arranged around the optical axis along the circumferential direction each of the support frame mounting sections being formed as a plate-like flange with a uniform thickness having disposed on one side thereof a helical screw receiving surface and having disposed on an opposite side thereof a helical surface for contact with the support frame, a plurality of contact sections for lens frame adjustment corresponding in number to the plurality of support frame mounting sections and formed in an outer peripheral portion of the lens frame, each of the contact sections for lens frame adjustment forming a helical first cam surface for mounting the support frame, the contact section for lens frame adjustment being arranged in each of the support frame mounting sections around the optical axis along the circumferential direction, a plurality of lens frame mounting sections corresponding in number to the plurality of support frame mounting sections and arranged in the support frame around the optical axis along the circumferential direction in locations corresponding to the locations of the support frame mounting sections, a plurality of contact sections for support frame adjustment corresponding in number to the plurality of lens frame mounting sections and arranged in each of the lens frame mounting sections around the optical axis along the circumferential direction, the contact sections for support frame adjustment forming helical second cam surfaces for contact with the helical first cam surfaces of the contact sections for lens frame adjustment for mounting the lens frame, the angle of inclination of each of the contact sections for support frame adjustment being formed the same as the angle of inclination of each of the contact sections for lens frame adjustment, and a plurality of fixing screws corresponding in number to the plurality of support frame mounting sections, each of the fixing screws having a head portion and a threaded portion, the lower surfaces of the head portions being received by the screw receiving surfaces of the support frame mounting sections and the threaded portions being inserted in corresponding elongated arcuate slots in the support frame mounting sections to securely fasten the lens frame to the support frame, wherein when the fixing screws are fixedly secured into the support frame, the fastening force generated between the lens frame and the support frame is applied perpendicular to the contact sections for support frame adjustment, whereby the lens frame is configured such that a fastening force effective between the lens frame and the support frame is to be applied perpendicular with respect to the contact section for support frame adjustment in a state of the contact section for lens frame adjustment being held in contact with the contact section for support frame adjustment.

2. The imaging lens of claim 1, wherein the support frame mounting sections are equally spaced from one another in the circumferential direction around the optical axis, the contact sections for lens flame adjustment are equally spaced from one another in the circumferential direction around the optical axis, and the contact sections for support frame adjustment are equally spaced from one another in the circumferential direction around the optical axis.

3. The imaging lens of claim 2, wherein the support frame mounting sections are configured so that a central angle defined by each of the mounting sections is in a range of 30 degrees to 90 degrees around the optical axis.

4. The imaging lens of claim 2, wherein each of the elongated arcuate slots define a central angle "DK" in a range of 25 degrees to 85 degrees.

5. The imaging lens of claim 2, wherein the central angle "DK" is sized to be smaller by 5 degrees to 15 degrees than a central angle defined by each of the support frame mounting sections.

6. The imaging lens of claim 2, wherein each of the screw receiving surfaces is arranged so as to be equally distant from each of the contact sections for lens frame adjustment.

7. The imaging lens of claim 2, wherein a central angle defined by each of the contact sections for support frame adjustment is 42 degrees around the optical axis.

8. The imaging lens of claim 1, wherein the angle of inclination of each of the contact sections for support frame adjustment is defined by a height difference of approximately 1.4 mm measured in a direction parallel to the optical axis across the arc length of the contact section for support frame adjustment.

9. The imaging lens of claim 7, wherein an error in the angle of inclination of each of the contact sections for support frame adjustment is less than or equal to 0.02 when represented by the height difference.

10. The imaging lens of claim 1, wherein the central axis line of the threaded portion of each of the fixing screws forms an angle of 4-degrees 7-minutes 20-seconds with respect to a plane normal to the optical axis when the fixing screws are fixedly secured into the support frame.

* * * * *